(12) United States Patent
Edwards et al.

(10) Patent No.: US 6,438,536 B1
(45) Date of Patent: Aug. 20, 2002

(54) METHOD AND SYSTEM FOR DYNAMICALLY GENERATING CODE TO ENHANCE THE PERFORMANCE OF A RELATIONAL DATABASE MANAGER THAT PROVIDES ACCESS TO A RELATIONAL DATABASE

(75) Inventors: David S. Edwards; David A. Egolf, both of Glendale; William L. Lawrance, Phoenix, all of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/408,767

(22) Filed: Sep. 29, 1999

(51) Int. Cl.[7] .............................................. G06F 17/30
(52) U.S. Cl. .......................................... 707/2; 707/100
(58) Field of Search ................................ 707/2, 100, 3, 707/5, 4, 101, 102, 103, 104; 711/100, 216; 709/215

(56) References Cited

U.S. PATENT DOCUMENTS 6,304,867 B1 * 10/2001 Schmidt ......................... 707/2
6,353,819 B1 * 3/2002 Edwards et al. ................ 707/2
6,353,820 B1 * 3/2002 Edwards et al. ................ 707/2

OTHER PUBLICATIONS

Database Products INTEREL Reference Manual INTEREL Performance Guidelines GCOS 8, Copyright Bull HN Information Systems Inc. 1996, Order No. LZ93 REV01B.

* cited by examiner

*Primary Examiner*—Sanjiv Shah
(74) *Attorney, Agent, or Firm*—Faith F. Driscoll; John S. Solakian

(57) ABSTRACT

A system and method that enhances the data access performance of a multi-layer relational database manager by expanding the code generation component layer of the database manager to include a number of performance enhancing subroutines designed to execute functions performed by lower component layers substantially faster than if the functions were executed by such lower component layers. Each such subroutine includes logic for establishing the conditions under which the particular subroutine is invoked during the processing of a SQL request. During process of generating code for a specific SQL query, the code generation component layer inserts calls to the different performance enhancing subroutines in place of normally included calls to lower component layers. This results in the insertion of the different performance enhancing subroutines into the generated code. Such routines enable the dynamically generated code at query execution time to perform lower component layer functions based on the characteristics of the original query statement resulting in increased performance.

23 Claims, 7 Drawing Sheets

METHOD AND SYSTEM FOR DYNAMICALLY GENERATING CODE TO ENHANCE THE PERFORMANCE OF A RELATIONAL DATABASE MANAGER THAT PROVIDES ACCESS TO A RELATIONAL DATABASE

RELATED PATENT APPLICATIONS

1. A Method and System For Using Dynamically Generated Code to Perform Record Management Layer Functions in a Relational Database Manager invented by David S. Edwards, David A. Egolf and William L. Lawrance, filed on even date, bearing Ser. No. 09/408,985 and assigned to the same assignee as named herein.
2. A Method and System For Using Dynamically Generated Code to Perform Index Record Retrieval in Certain Circumstances in a Relational Database Manager invented by David S. Edwards and Todd Kneisel, filed on even date, bearing Ser. No. 09/408,986 and assigned to the same assignee as named herein.

BACKGROUND OF THE INVENTION

1. Field of Use

The present invention relates to data processing systems and more particularly to database management systems.

2. Prior Art

Typically, today's enterprise or legacy systems store large quantities of data in database systems accessed by database management system (DBMS) software. In such database systems, data is logically organized into relations or tables wherein each relation can be viewed as a table where each row is a tuple and each column is a component of the relation designating an attribute. It has become quite common to use relational database management systems (RDMS) for enabling users to enter queries derived from a database query language, such as SQL, into the database in order to obtain or extract requested data.

In compiling type database management systems, an application program containing database queries is processed for compilation prior to run time. This can be done and more frequently is done at run time by users of the INTEREL product discussed herein. Users of other database products such as DB2, do such processing prior to run time.

During compilation, database queries are passed to the database management system for compilation by a database management system compiler. The compiler translates the queries contained in the application program into machine language. Generally, a database compiler component referred to, as a query optimizer is included in the database management system to select the manner in which queries will be processed. The reason is because most users do not input queries in formats that suggest the most efficient way for the database management system to address the query. The query optimizer component analyzes how best to conduct the user's query of the database in terms of optimum speed in accessing the requested data. That is, the optimizer typically transforms a user query into an equivalent query that can be computed more efficiently. This operation is performed at compile time, in advance of execution.

A major component of the RDBMS is the database services component or module that supports the functions of SQL language, such as definition, access control, retrieval and update of user and system data. Such components may utilize a multilayer structure containing submodules or components for carrying out the required functions. For example, one such system includes a series of components or conceptually, a series of layers for carrying out the required functions for accessing data from the relational database. More specifically, a first layer functions as a SQL director component that handles requests at the interface to the requesting or calling application program. A second layer consists of two major components, an optimizer for optimizing the query and a RAM code generation component. The optimizer processes the query by determining the appropriate access plan strategy. The code generation component generates code according to such plan for accessing and processing the requested data. The access plan defines the type of access to each table, order of access, whether any sorts or joins are performed along with other related information.

The generated code calls a third layer that functions as a relational file manager (RFM) component. This component layer performs the relational file processing function of translating the code-generated requests into I/O file read/write requests. A fourth layer that functions as an 10 Controller performs the requested I/O operation designated by such I/O file requests that results in reading/writing the relational database files in page increments. The described architecture is characteristic of the INTEREL product developed and marketed by Bull HN Information Systems Inc. For information concerning this product, reference may be made to the publication entitled, "Database Products INTEREL Reference Manual INTEREL Performance Guidelines, Copyright, 1996 by Bull HN Information Systems Inc., Order No. LZ93 Rev01B.

It has been found that while the above architecture provides design advantages, it tends to slow down relational data access performance. More specifically, the relational retrieval process involves the execution of functions by a series of components or layers that can result in decreased performance. This is the case particularly when the RDMS is required to access non-partitioned (i.e., single page) data rows and perform index record retrieval operations.

Accordingly, it is a primary object of the present invention to provide a more efficient method and system for improving relational data access performance.

SUMMARY OF THE INVENTION

The above objects are achieved in a preferred embodiment of the present invention that can be utilized in a relational database management System (RDMS) that implements the Structured Query Language (SQL) standard. The present invention is a system and method that enhances the data access performance of a multi-layer relational database manager. According to the teachings of the invention, the code generation component layer of the database manager is expanded to include a number of performance enhancing subroutines designed to execute functions performed by lower component layers substantially faster than if the functions were executed by such lower component layers. Each such subroutine includes logic for establishing the conditions under which the particular subroutine is invoked during the processing of a SQL request. The different types of performance enhancing subroutines are described in the above-related patent applications.

According to the teachings of the present invention, during process of generating code for a specific SQL query, the code generation component inserts calls to the different performance enhancing subroutines in place of normally included calls to lower component layers. This results in the insertion of the different performance enhancing subroutines into the generated code. In the preferred embodiment, such routines enable the dynamically generated code to perform lower component layer record management functions based on the characteristics of the original query statement resulting in increased performance. For example, record management functions that are normally performed by the system's relational file manager component. Hence, when the generated SQL query code is being executed and accesses the predetermined type of data file record, the performance enhanced subroutine is executed in lieu of calling lower component layers to perform the required record file processing. By eliminating or bypassing such other layers, relational data access performance is substantially increased.

The present invention by incorporating the required record management functions into the code generated to execute the SQL query can be easily implemented without having to make changes to the other components/layers of the relational database manager.

The above objects and advantages of the present invention will be better understood from the following description when taken in conjunction with the accompanying drawings.

BRIEF DESCRIPTION OF THE DRAWINGS

FIG. 2b is a block diagram illustrating in greater detail, the major components of the second layer of the RDMS of FIG. 2a.

FIG. 2d illustrates the operational relationships between the second and third layers of the RDMS of FIG. 2a.

DESCRIPTION OF THE PREFERRED EMBODIMENT

FIG. 1

Figure 1:
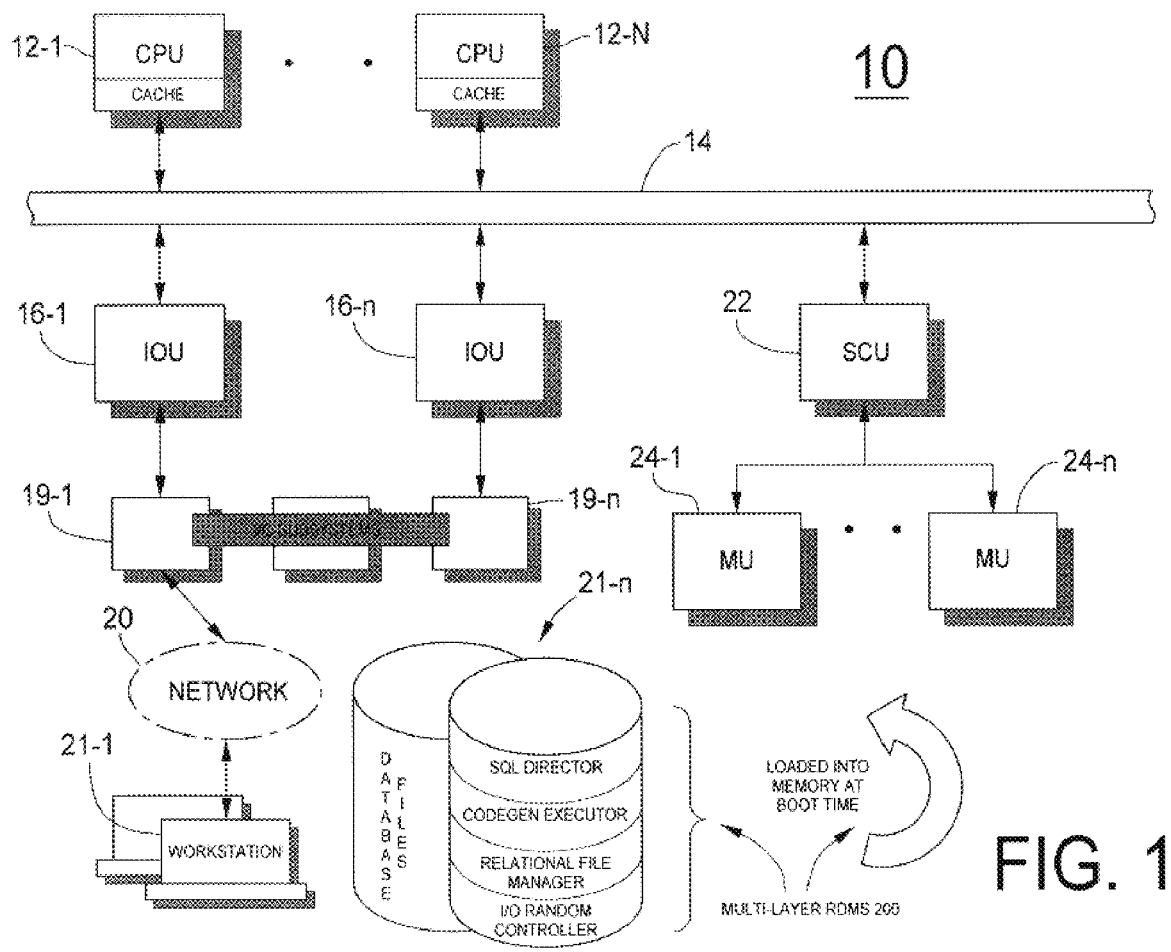
FIG. 1 is an overall block diagram of a data processing system that utilizes the teachings of the present invention.

FIG. 1 is a block diagram of a conventional data processing system 10 that utilizes the system and method of the present invention. As shown, the system 10 includes a plurality of processing units 12-1 through 12-n which connect to a system bus 14 through their individual physical caches in common with a number of input/output units (IOUs) 16-1 through 16-n and a system control unit (SCU) 22. As shown, each IOU couples to a particular I/O subsystem (i.e., 19-1 through 19-n) which in turn connect to any one of a number of different types of devices both local and remote such as workstation 21-1 via a network 20 or disk mass storage units 21-n as indicated.

The SCU 22 connects to a number of memory units (MUs) 24-1 through 24-n. For the purpose of the present invention, system 10 may be considered convention in design and may for example utilize a mainframe computer system such as the DPS9000 manufactured by Bull HN Information Systems Inc. which operates under the control of the GCOS8 operating system.

As shown, the system 10 further includes disk storage 21-n that contains the database system that utilizes the teachings of the present invention. It will be appreciated that the software components that comprise the database system including the software components of the present invention may be loaded into the system 10 in a conventional manner (e.g. via CDROM, disk, communications link, etc.). The database system includes a multi-layer relational database management system (RDMS) and a relational database containing established data files. The relational database management system processes all user requests for accessing the files contained on disk storage 21-n. Users initiate such requests via the network 20 by executing transaction processing routines or batch decision support programs via their workstation keyboard and/or via other input devices (e.g. mouse). The system 10 upon receiving an SQL query operates to initiate a search of the relational database files to obtain the data requested by the user.

In system 10, the relational database management system (RDMS) takes the form of the above mentioned INTEREL software which runs under the GCOS8 operating system. As shown, the RDMS contains a SQL Director component layer, a Codegen Executor component layer, a Record File Manager (RFM) component layer and an IO Random Controller component layer. These component layers are shown in greater detail, in FIG. 2a along with other database related components.

Figure 2A:
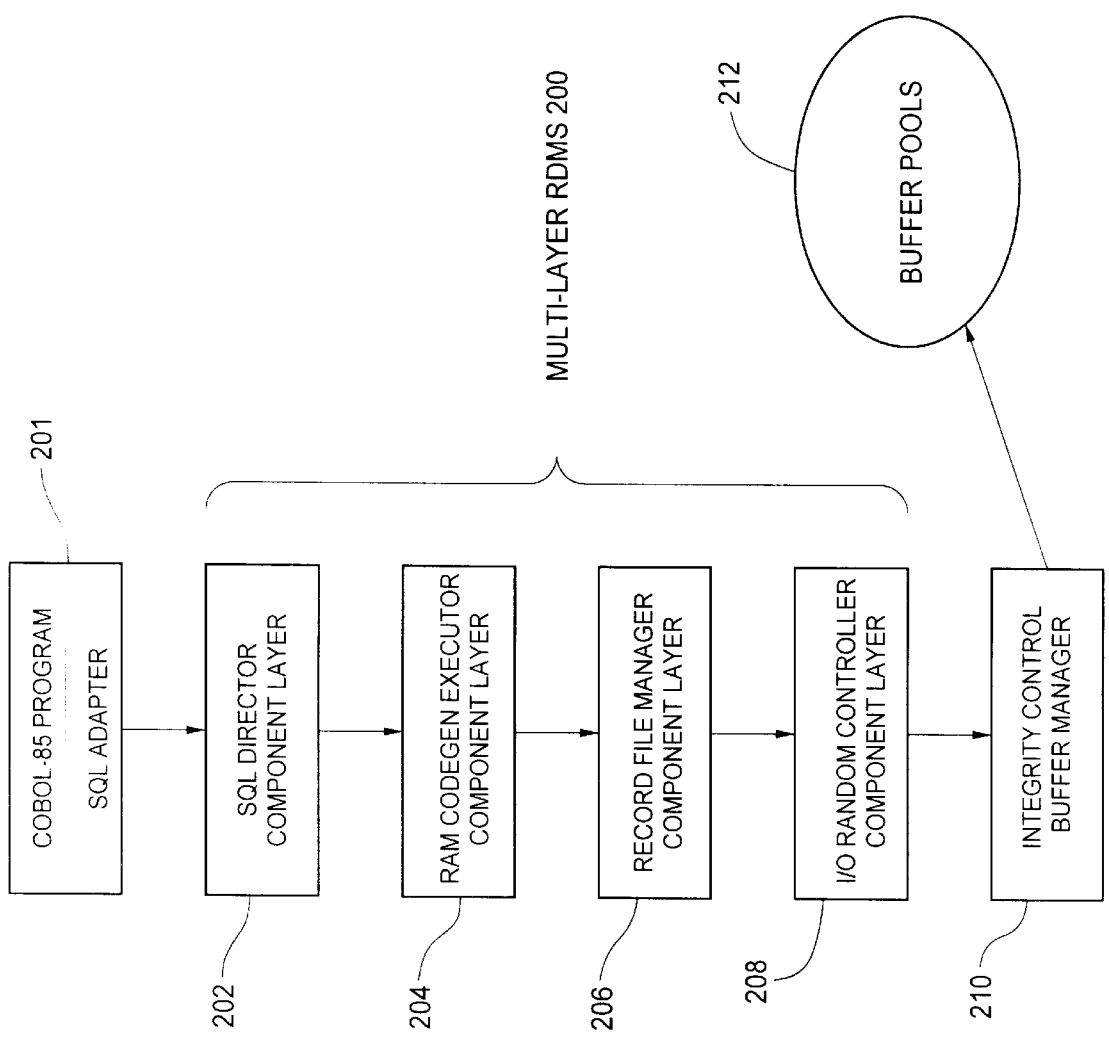
FIG. 2a is a block diagram illustrating the multi-layer organization of the relational database manager system (RDMS) of FIG. 1.

FIG. 2a—Multi-layer RDMS Organization

FIG. 2a depicts the major components of the RDMS that utilizes the teachings of the present invention. As shown, these components include the four component layers of RDMS 200 (INTEREL software) discussed above. During normal operation, the different software components of RDMS 200 including the present invention are loaded from disk storage 21-n into memory (e.g. MU 24-1) in a conventional manner.

In greater detail, SQL Director Component layer 202 operatively couples to an SQL adapter 201 that serves as the application's interface to the RDMS 200. The SQL Adapter 201 includes a runtime library that contains runtime routines bound into the application used by an application such as a COBOL-85 program for issuing calls. Each such call results in library sending a query statement to the SQL Director component layer 202.

The SQL Director component layer 202 handles the interface processing between RDMS 200 and a calling program. Thus, it manages the database connection. Layer 202 contains routines which analyze each query statement for determining if the statement is of a type that accesses relational database files and thus is suitable for code generation and caching. Each process utilizes a "local cache" for such storage. The use of "local caches" is discussed in the above referenced INTEREL Reference manual. Additionally, reference may be made to the copending patent application of Donald P. Levine and David A. Egolf, entitled: A Method and Apparatus for Improving the Performance of a Database Management System Through a Central Cache Mechanism, bearing Ser. No. 08/999,248 filed on Dec. 29, 1997 which is assigned to the same assignee as named herein.

As indicated, the SQL Director component layer 202 operatively couples to the RAM Codegen Executor Component layer 204. The SQL Director component layer 202 also contains routines that generate calls to a cache manager component to see if the code for that statement can be found in the process's local cache. When code for that statement is not found in the local cache, the SQL Director component layer 202 calls the RAM Codegen Executor Component layer 204 to process and "potentially" execute the query statement.

The RAM Codegen Executor layer 204 processes the SQL query. If the code has been generated for a particular query, layer 204 executes such code. When code has not been generated for a particular query, layer 204 optimizes the SQL query, generates code according to the optimized access plan and processes the requested data. The generated code is stored in "local cache" and executed.

As shown, the RAM Codegen Executor Component layer 204 operatively couples to the Record File Manager component layer 206. During execution, the generated code calls various RFM functions to read or write relational data and/or index information from RFM files. Hence, this layer does not deal with the physical storage of data in a file.

The RFM component layer 206 performs the relational processing for RDMS 200. It receives the read and write requests from layer 204 and then translates them into IO file read and write requests respectively. It processes the file pages (CIs) read by layer 208 to which it operatively couples. Thus, this layer hides the physical storage of data and all other file format details from layer 204.

The IO Random Controller component layer 208 receives the requests from layer 206 and performs the relational file processing of translating the code-generated requests into I/O read/write requests. It processes the database files in page increments (CI). It is oblivious to physical storage of the data on the page. These details are handled by the other components illustrated in FIG. 2a. That is, layer 208 operatively couples to Buffer pools 212 via an Integrity Control Buffer Manager component 210. As known in the art, buffer pools contain buffers having a specific page size (control interval (CI). These buffers are used by the RDMS files. This arrangement is discussed in the above-mentioned INTEREL reference manual.

Figure 2B:
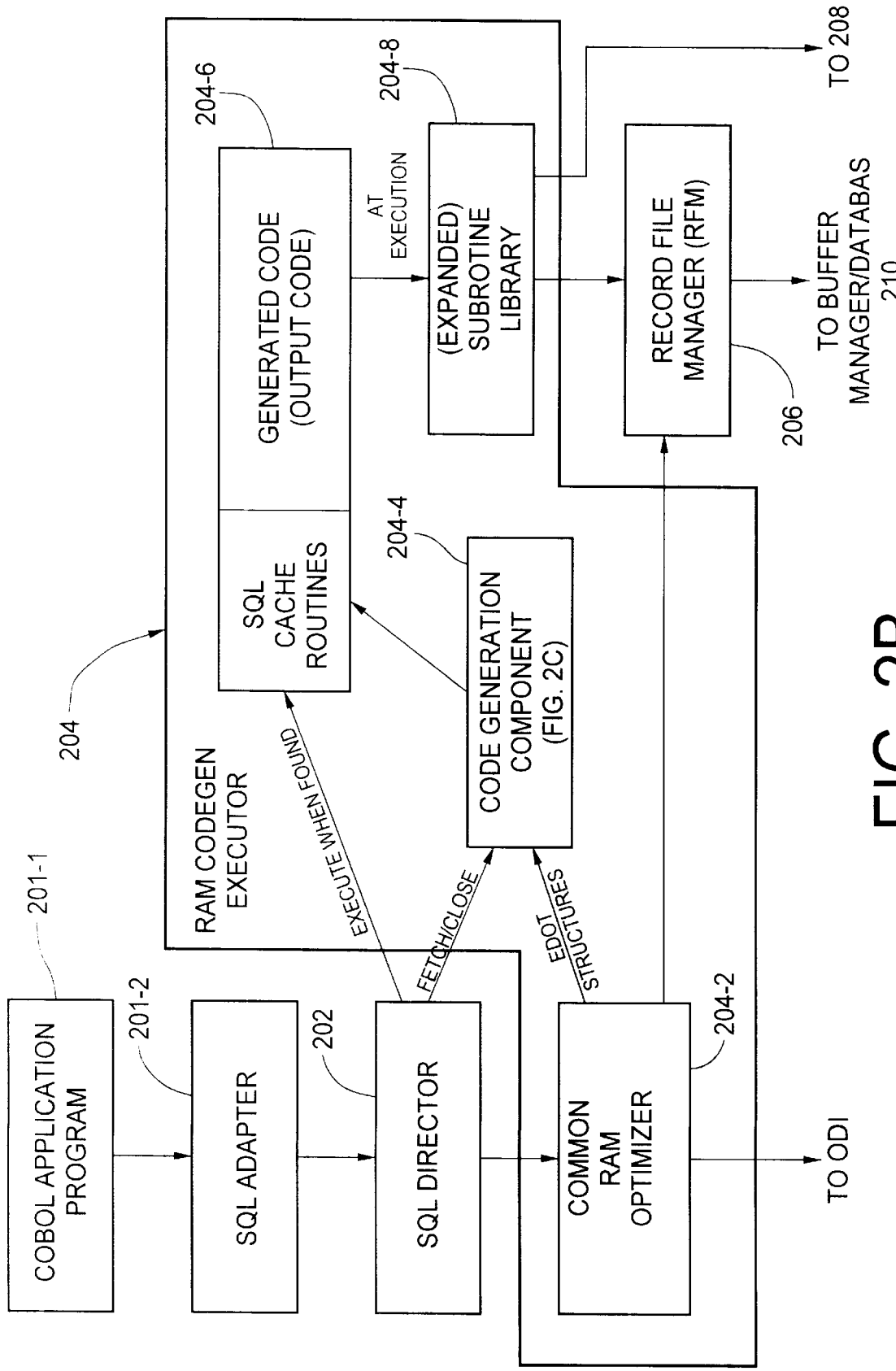

RAM Codegen Executor Layer 204—FIG. 2b

This figure illustrates in greater detail, the components that make up layer 204 according to the teachings of the present invention. As indicated, the layer 204 includes a common RAM Optimizer component 204-2, a code generation component 204-4, a code generation storage component corresponding to SQL cache memory component 204-6 and subroutine library component 204-8. These components are operatively coupled as shown.

As discussed above, optimizer component 204-2 processes the SQL query by determining the appropriate access plan strategy. As a result of such processing, component 204-2 generates a set of EDOT structures that define the operation (SQL query) to execute (e.g. SELECT, UPDATE, INSERT or DELETE), the data to process (e.g. columns), the access method to use (e.g. scan or index or hash) and the restrictions that apply versus the access method to limit the amount of data (or rows) to process. Also, the structures define where the data obtained for the query is to be returned to be used by a user. The path to ODI is used only during EDOT generation for verifying the query for correctness (e.g. does a specified column belong to a specified table). As indicated, the EDOT structures are applied as inputs to Code generation component 204-4. This component generates the required code that is stored in cache storage 204-6.

The cache storage 204-6 operatively couples to a subroutine library 204-8. Library 204-8 contains subroutines for communicating with RFM component layer 206. In accordance with the teachings of the present invention, library 204-8 also includes a number of performance enhancing subroutines that allow the bypassing of the RFM layer 206 as discussed herein. In this case, library 204-8 operatively couples to component layer 208 as indicated in FIG. 2b.

Figure 2C:
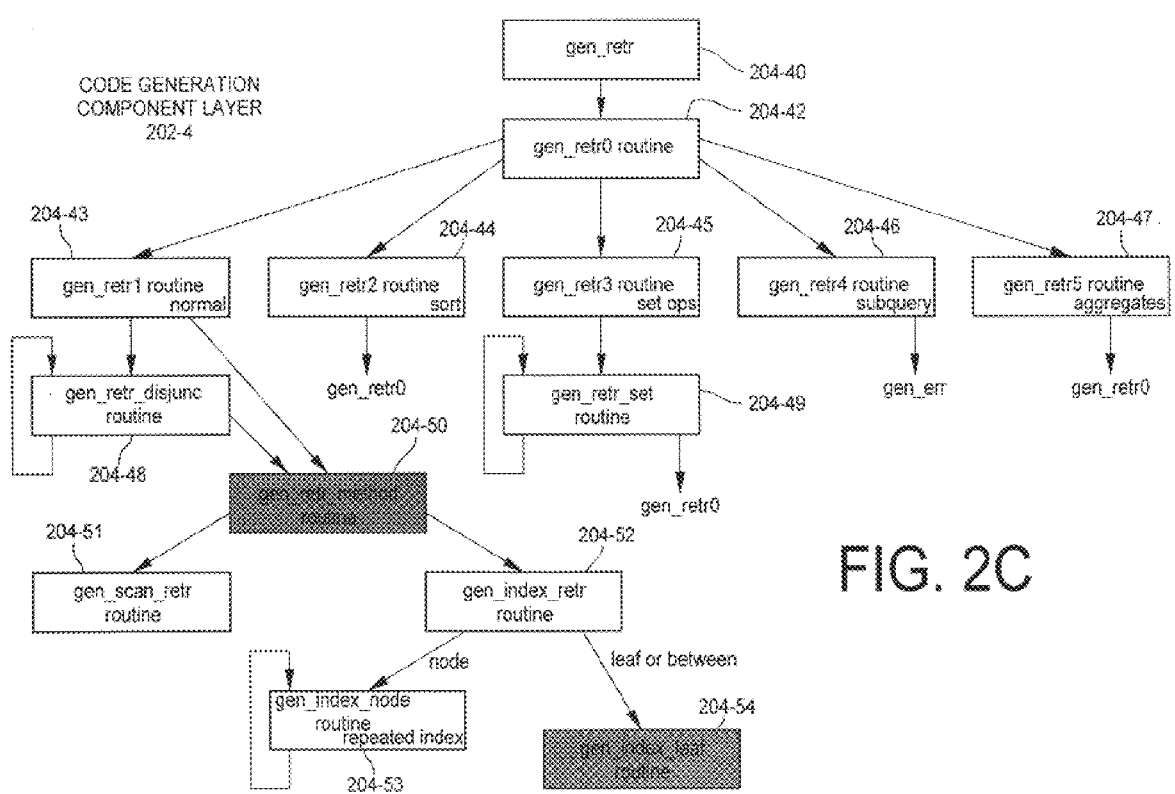
FIG. 2c is a block diagram illustrating in greater detail, the code generation component of FIG. 2b designed to utilize the teachings of the present invention.

Component 204-4 Code Generation Routines—FIG. 2c

FIG. 2c illustrates in greater detail, the structure of a portion of component 204-4 according to the present invention. More specifically, FIG. 2c depicts the routines that generate the code to perform index or data file retrievals. These routines include a number of standard routines that correspond to blocks 204-40 through 204-49 and 204-53. Additionally, the routines gen_retr_method function 204-50 and the routine gen_index_leaf have been extended according to the present invention. The routine gen_retr_method 204-50 generates the code to call a performance enhancing subroutine for increasing and enhancing data row retrieval performance. The routine 204-50 incorporates into the code, any information that is necessary for carrying out the functions of the bypassed RFM manager component 206.

The routine gen_index_leaf 204-54 determines whether to produce code that calls a different performance enhancing subroutine for executing indexing operations. By extending the code generation component 204-4 to include subroutines for adding specific code that calls specific performance enhancing subroutines, this results in a substantial improvement in overall performance in the RDMS.

Description of Operation

With reference to FIGS. 1 through 2c, the operation of the preferred embodiment of the present invention will now be described with reference to FIGS. 2d, 3a and 3b.

FIG. 2d

Figure 2D:
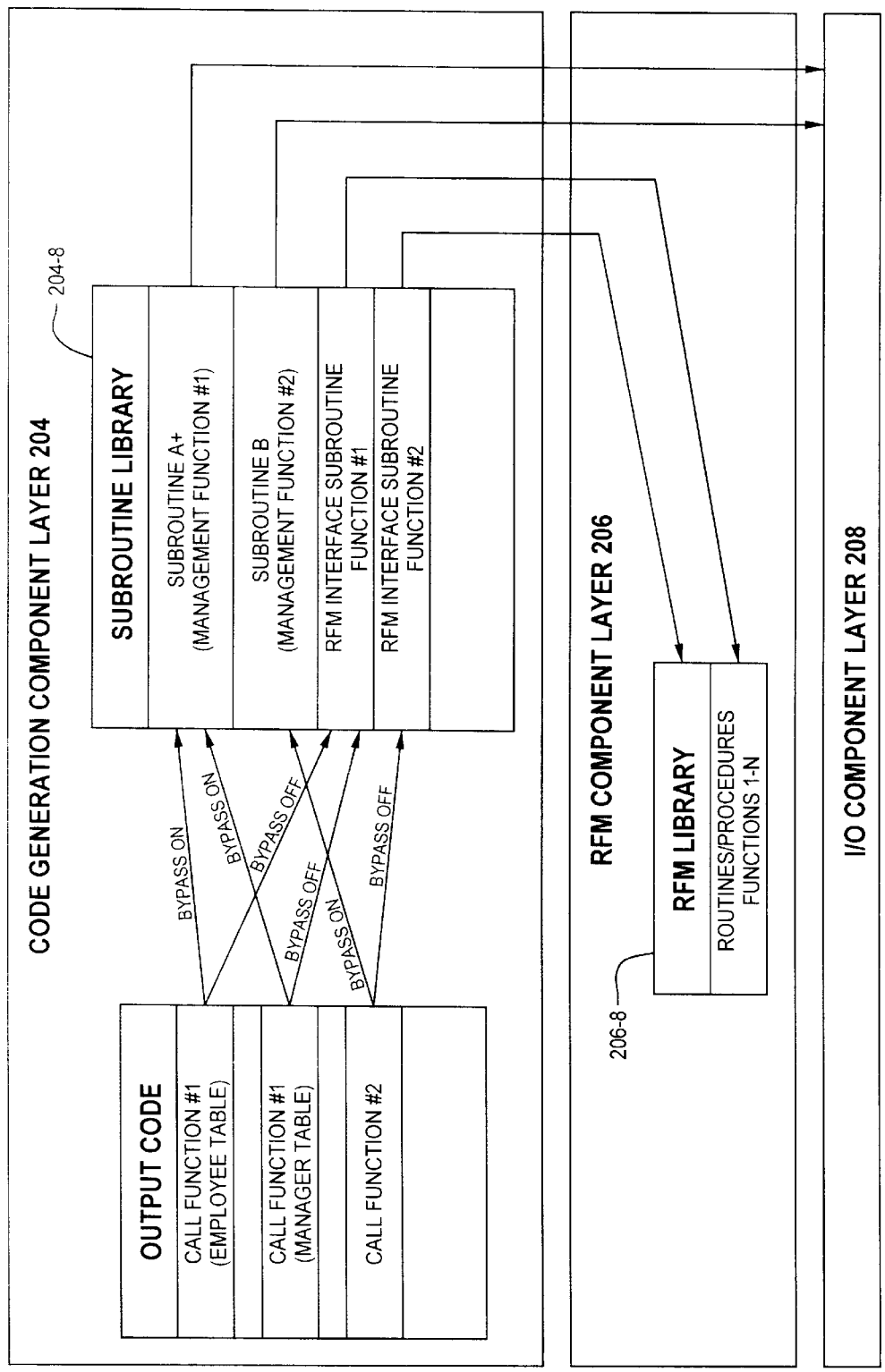

FIG. 2d illustrates conceptually, the layered organization of the present invention and more particularly, the organization of the code generation component layer 204 when having processed a particular SQL query. For example, FIG. 2d illustrates the case where layer 204 includes two performance enhancing subroutines corresponding to subroutines A+ and B prestored in subroutine library 204-8 for implementing record management functions #1 and #2 respectively. Also, as indicated in FIG. 2d, library 204-8 further includes the normal RFM interface subroutines for carrying out functions #1 and #2 in the conventional manner by use of the lower RFM component layer 206 routines/procedures stored in RFM library 206-8.

During the processing of an SQL query, the code generation component layer 204 operates to generate code that includes specific call functions to either performance enhancing subroutines A+ and B or to the standard RFM interface subroutines. The pairs of dotted lines labeled "bypass" and "no bypass" between the output code block and subroutine library 204-8 indicates this in FIG. 2d. When a specific operation is determined to be required that can utilize one of the performance enhancing subroutines stored in library 204-8, code generation component layer 204 includes in the output code, a call that references that performance enhancing subroutine thereby bypassing RFM lower layer 206.

For example, in the preferred embodiment of the present invention, management function #1 is utilized in the handling of unpartitioned and partitioned data rows while management function #2 is utilized in the handling of index searching. FIGS. 3a and 3b illustrate the use of the performance enhancing subroutines that implement these functions. It was determined that these record management functions could be more expeditiously handled by operating outside the RFM layer. However, it will be appreciated that other record handling functions could also have been selected but such functions were determined to have less effect on performance.

Functions #1 and #2 will now be considered in greater detail. As indicated in FIG. 3a, function #1 involves both partitioned and unpartitioned data rows. A partitioned row is a row that was originally inserted into a database page (i.e., CI). Initially, rows are always inserted into the database in an unpartitioned manner. That is, the RFM component layer 206 enforces a rule that initially the row must completely fit within the target page (i.e., CI). If the row does not fit into a given CI, a page is found that contains enough unused space to accommodate the row. Rows become partitioned when updates occur. For example, assume that a row was inserted into the database page that took up 200 bytes of storage and left 20 bytes of space remaining in the page. If an update occurs that changes a column that had used no bytes of space (i.e., it was NULL) to using 50 bytes of space, then the row no longer fits in the page or CI (i.e., the page is 30 bytes too small). When this occurs, the RFM component layer 206 will transfer a subset of the row into another page. This results in the data row being split over two pages or CIs. This process can continue so that theoretically, different parts of the row exist in many pages. Since partitioned rows represent the exception and not the normal case, function #1 is used to handle unpartitioned row retrievals resulting in enhanced performance.

Figure 3A:
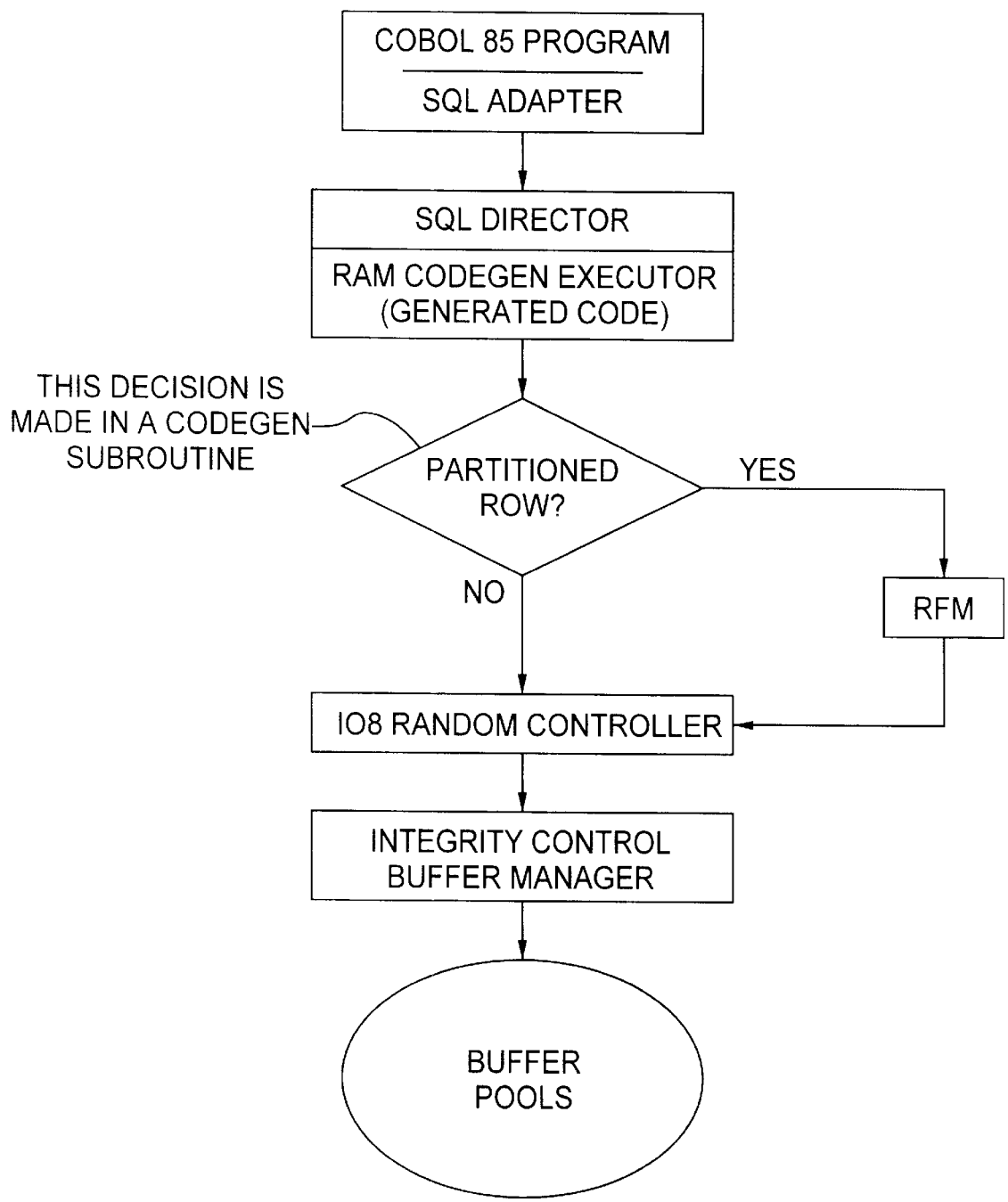
FIGS. 3a and 3b illustrate the operational flow of two performance enhancing subroutines utilized according to the teachings of the present invention.

FIG. 3a illustrates the manner in which component layer 204 utilizes function #1 in executing unpartitioned row retrievals. As indicated in FIG. 2d, the output code generated by layer 204 includes calls to subroutine A+ for two data items of the SQL query being processed. That is, it is assumed by way of example that the SQL query is generated for obtaining employee information for different employees requiring access to an employee table and a manager table. Accordingly, layer 204 generates code via routine gen_retr_method 204-50 of FIG. 2c includes calls to subroutine A+ in the output code as indicated in FIG. 2d.

During execution, it is seen from FIG. 3a that subroutine A+ when called determines if the row being accessed is partitioned. This determination can be made by examining the record header information. If the row is not partitioned, then subroutine A+ performs the required record management operations by calling IO component layer 208 as indicated in FIG. 2d.

In greater detail, during execution, the generated code passes to subroutine A+, a database key (DBK) for the row to retrieve. The DBK that was acquired in a prior index lookup, includes the CI number and a line array offset (i.e., the row identifier within the CI). Subroutine A+ will call IO component layer 208 and acquire the CI. Subroutine A+ will identify the row within the CI. Subroutine A+ will then examine the row's record header (i.e., includes a predetermined bit pattern coded to indicate if the record is partitioned) to determine if the row is partitioned. If it is not partitioned, subroutine A+ returns control to its calling routine. If the row is partitioned, then subroutine A+ calls the RFM component layer 206 to process the partitioned row. By bypassing the call to the RFM component layer 206 for unpartitioned rows (i.e., the normal case), a significant advantage in performance is obtained.

When subroutine A+ determines that the row from which data is being accessed is partitioned, then subroutine A+ calls the appropriate procedure within RFM library 206-8 for accessing the partitioned row data. The run time decision relative to the row being partitioned is made on the first call to IO component layer 208 (i.e. on the first call to the IO random controller of FIG. 3a). The RFM library procedure operates to retrieve all the pieces, concatenates them together and then returns to subroutine A+. Subroutine A+ passes a pointer to the concatenated row back to the generated output code for retrieval of the desired columns. For further details about this operation, reference may be made to the first cited related copending patent application.

As indicated in FIG. 2d, the generated output code also contains reference calls to subroutine B for those parts of the SQL query that involves index searching. As known in the art, index searches are very common events in relational database processing. They can occur when processing SELECT, UPDATE or DELETE SQL statements. Because index searches occur so frequently, this was determined to be another area where a performance enhancing subroutine could be utilized.

Figure 3B:
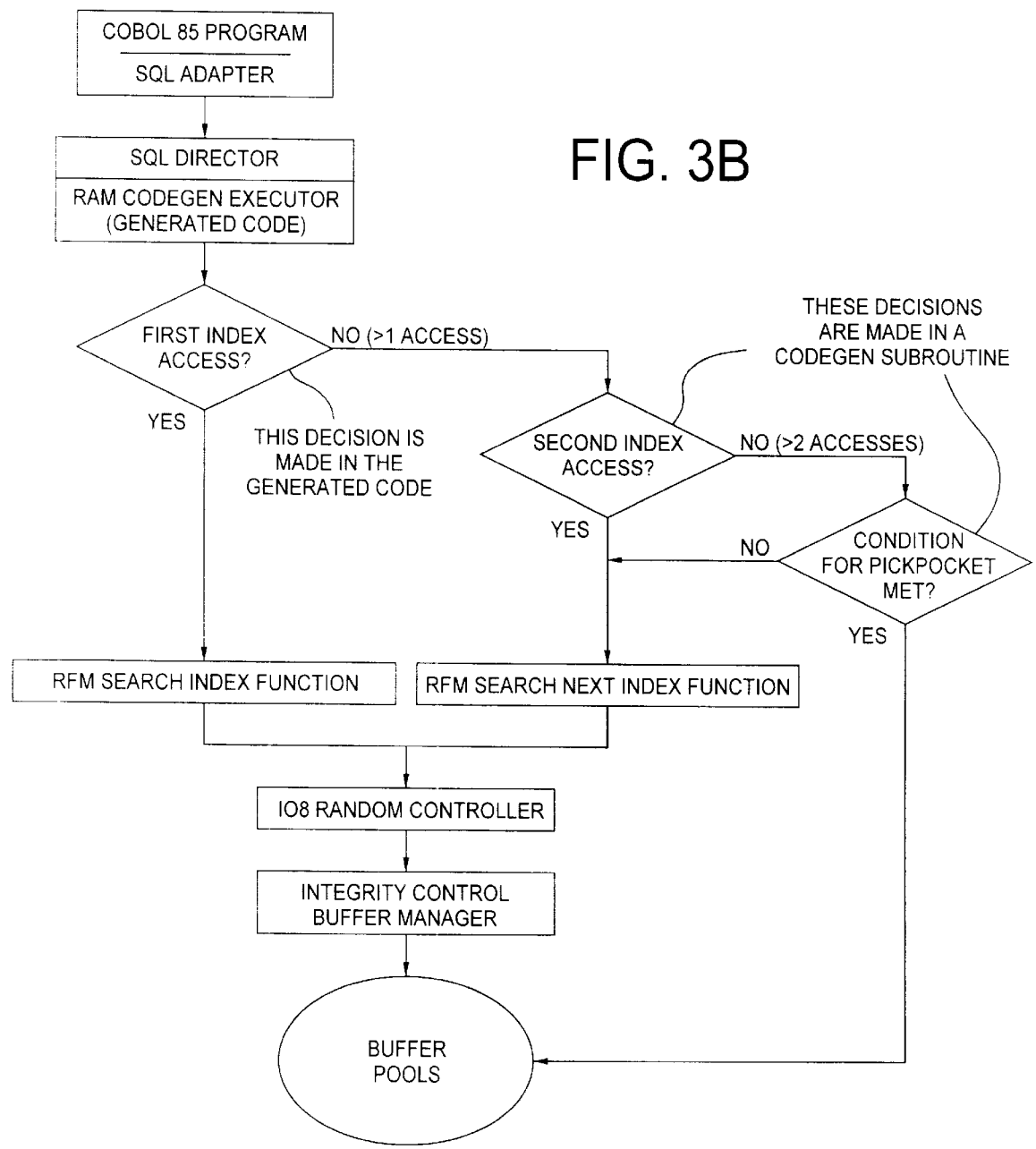

FIG. 3b illustrates the manner in which index searches and more specifically, index scan operations are executed according to the teachings of the present invention. Generally, as indicated in FIG. 3b, standard index processing performed by the code generation layer 204 in conjunction with RFM layer 206 is performed in two steps. As a first step, as indicated in FIG. 3b, the layer 204 calls the RFM layer 206 to search for a specific index value. This is called the Find Index search. Once the RFM layer 206 finds the index entry, it establishes a currency to it. This currency is control information that indicates which fine level index entry corresponded with the search request. This currency information is stored in the RFM schema structure. The RFM layer 206 establishes a currency ID for the currency from the currency ID information that the code generation layer 204 sets in a RFM control structure RFM_XPT prior to the call.

The RFM_XPT is a very complex structure that is used by callers of RFM component layer 206 to pass in instructions to the operation to be performed by the RFM layer 206 and to return information pertaining to the result of the operation. Typically, the information passed would include the identification of the file to process, a directive on what type of search to do (i.e., >=), pointers to where the starting index value is stored, a pointer to where the result should be returned, the currency ID, etc. An example of the type of information returned would be status. See the glossary for additional information regarding the RFM_XPT structure.

In a second step, the code generation layer 204 calls the RFM layer 206 to return the next index entry as indicated in FIG. 3b. Because the index fine level entries are in sorted order, this means that the code generation layer 204 can pass in the currency ID from the prior search. Thus, the RFM layer 206 can go to the currency information stored in the RFM schema structure and use it to find the next index entry without having to repeat the index search. After the RFM layer 206 has identified the next index entry, it updates the currency information in the RFM schema structure. This second step is repeated until the query processing is completed.

As indicated in FIG. 3b, the second step is altered to improve index access Search Next performance. The output code calls the subroutine B to determine if more than two next index accesses have been processed. On the second Search Next request, the subroutine B examines the fine level index CI from which the prior index entry was retrieved. If the currency has not changed and the index CI has not changed and if the currency points to a fine level index entry that does not have duplicates, then the subroutine B copies the fine level index entry from the fine level index CI located in the buffer pool to the requestor's key buffer along with the database key (DBKEY). The subroutine B updates the currency information to point to the next fine level index entry. Finally, the subroutine B returns to the caller. When any one of the conditions is not satisfied, subroutine B calls the RFM Search Next function procedure contained in RFM library 206-8 via the RFM interface function #2 subroutine of FIG. 2d to process the request.

Thus, each time the subroutine B is executed, this reduces the number of calls to the RFM layer 206 and IO layer 208 thereby substantially increasing performance. For further information regarding the operation of subroutine B, reference may be made to the second cited related patent application. The appendices illustrate examples of the output code organization used for implementing the preferred embodiment of the present invention.

While the present invention was described relative to processing SQL statements, it will be obvious to those skilled in the art that the present invention may be used in conjunction with other languages, code, etc. Further, the invention may be utilized in any system that generates executable code at execution time wherein the system generates support code and calls to task specific functions that permit the most commonly performed tasks to be executed as efficiently as possible. Thus, the code generated at executed at execution time in conjunction with its subroutines will circumvent a layer of the established architecture in order to improve performance.

It will also be appreciated that while the data manager software of the present invention was disclosed as being utilized with an enterprise or legacy system, it is not in any way limited to such use. It may be utilized with any RDMS installed on any type of computing system.

Express Mail Label No.
US EL200037275
52-3180

-16-

APPENDICIES

I. Glossary
II. Code Snippets utilized by Code Generation Component to Generate Calls to Enhanced Data Row Retrieval and Index Retrieval Subroutines
III. Code Generated at Execution Time to Optimize Data Row Retrieval
IV. Example of Code Generated to Call the Index Retrieval Subroutines
V. Optimizer Output-EDOT Example Expi Mail Label No.
US EL200037275
52-3180

APPENDIX I

Glossary

- access method — The way in which the RDBMS accesses relational data, using hash, indexed, or scan access.
- access plan- — The RDBMS Optimizer's plan for executing an SQL statement, including the type of access to each table, order of access, whether any sorts or joins are performed, and related information.
- administrator- — An individual who carries out tasks such as creating databases and/or monitoring the use and performance of those databases.
- application- — A program or set of programs that performs a specific task, such as entering orders and updating inventory records.
- application programmer (application developer)- — An individual who participates in the design, implementation, and/or testing of applications, including end-user facilities.
- attribute- — A descriptive characteristic of an entity, such as name, order number, item quantity, and so on. A characteristic such as UNIQUE or NOT NULL that can be applied to a column or other entity.
- Buffer Manager- — The software that manages buffer pools.
- buffer pool- — Main memory that is reserved for the buffering requirements of one or more tablespaces, tables, or indexes.
- Central SQL Cache- — Configured memory space in which code segments generated by the RDBMS are stored for reuse if the same SQL statement is executed again by any process that has been associated with this same Express Mail Label No.
US EL200037275
52-3180

-18-

|   |   |   |
|---|---|---|
|   |   | Central SQL Cache. The use of one or more Central SQL Caches is optional and under Administrator control. |
|   | • CHARACTER data type- | An RDBMS data type defined as fixed-length character. |
|   | • code generation- | The RDBMS process that generates executable code for a specific SQL statement instead of executing that statement interpretively. |
|   | • code segment- | The code generated by the RDBMS for a specific SQL statement. Each code segment is stored in the Cache for reuse if the same SQL statement is executed again by the same process in the case of Process-Local SQL Cache, or by another process in the case of Central Cache. |
|   | • code_token (node) | An item that uniquely refers to a segment of generated code. |
|   | • column- | The vertical component of a table. A column contains information about one of the attributes of an entity. The relational equivalent of a field. |
|   | • concurrency control- | The management of file accesses by processes operating concurrently, with the goal of ensuring that no process interferes with any other process and that the integrity of the data accessed in common is maintained. |
|   | • concurrency level- | The number of processes that concurrently access the same data. |
|   | • concurrent access- | Two or more processes accessing the same data table or partition at the same time. |

- Control Interval (CI)- The physical space increment used to store data in RDBMS files, processed as a unit. Synonymous with page. In a hash table, a CI is called a hash bucket.
- data type- A definition of how the data in a column is stored and managed. Commonly used data types include CHARACTER, NUMERIC, and FLOAT.
- database- A collection of data that has meaning to an organization or to an individual and that is managed as a unit.
- database key (DBK) A database key is a key that consists of the CI number and line array for a row. When a row is inserted into a table in an INTEREL/RFM database, RFM assigns a DBKEY to the row's index entry. This DBKEY is appended to the index entry so that when the entry is found later by a search, the DBKEY is then used to locate the data row.
- Database Management System (DBMS)- A set of software that controls the creation, organization, and modification of one or more databases, and provides access to the stored data.
- Data Definition Language (DDL)- Statements used to define the entities, attributes, and relationships that make up a database. DDL statements in RDBMS include CREATE MODEL, CREATE TABLE, CREATE INDEX, and others.
- Data Manipulation Language (DML)- Statements used to access data and potentially to change data content. DML statements in RDBMS include SELECT and UPDATE.

Express Mail Label No.
US EL200037275
52-3180

-20-

- DATE data type- A special-purpose RDBMS data type used to store a four-byte date that can be used in comparisons or computations. The date is formatted in packed decimal in the row in storage, and expanded when read into application memory.

- DECIMAL data type- An RDBMS data type defined as fixed-length with decimal content.

- EDOT A set of structures resulting from the processing of a query by an optimizer. The term EDOT pertains to the identification of the file code where these structures were once stored (i.e., the E.file code file).

- FROM clause- The part of an SQL statement that specifies the table(s) from which data is to be accessed.

- generated code- A reusable set of machine instructions that are produced to execute a particular SQL statement.

- gen_time (node) The approximate time that was required to generate the associated segment of code.

- host variable- Storage allocated by a language processor such as COBOL-85 for use in passing variable information to or from an SQL statement.

- host-relational files- Files managed by RAM/RFM and maintained on mass-storage devices attached to a system. The term is used to distinguish these files from relational files maintained by a Relational Data Base Computer linked to a system.

- index- A set of pointers to data in relational tables, used to improve the speed of access to the data. The index is maintained in the form of a balanced B-tree structure.

| | |
|---|---|
| • index key- | The column(s) whose values are included in the index for the table. |
| • indexed access- | The access mode in which RDBMS uses one or more indexes to retrieve the requested information. In some cases, RDBMS can retrieve the requested information directly from the index, without accessing the data table. |
| • indicator variable- | An indicator used to notify the application that an exception condition, such as an overflow or truncation error, occurred. When used to indicate the presence of the null value, the indicator is referred to as a null indicator variable. |
| • indicator column- | A technique in denormalization in which an indicator column in one table indicates whether an access to a second table is required. Using an indicator column introduces the risk that data anomalies will occur. |
| • INTEGER data type- | An RDBMS data type used to store binary values. |
| • integrity- | The property of being logically correct and consistent. In some cases, this term also implies denying access to unauthorized users and processes. |
| • null value- | A value designed to be used when the actual value is unknown or inappropriate. For example, using the null value for a price that has not yet been defined avoids the ambiguity of using a zero value in this case. |
| • null indicator variable- | An indicator used to notify the application that a column contains the null value. |
| • NUMERIC data type- | An RDBMS data type defined as fixed-length and limited to the numerals 0-9. |

-22-

- Operational Directory Interface (ODI)- A data definition directory used by RDBMS.
- Optimizer- The software component of RDBMS that analyzes each SQL statement and defines the access plan that will produce the optimum performance for the execution of that statement.
- page- The physical space increment used to store data in RDBMS files, processed as a unit. Synonymous with control interval (CI).
- partitioned row A row that was originally inserted into a database page and was subsequently updated so that the row exists in more than a single page or CI.
- partitioned tablespace- A tablespace that contains a single table that is too large to process efficiently as one entity. The tablespace and the table are separated into partitions that can be placed on different mass storage devices. Each partition can be processed independently.
- performance- The ability of applications and interactive facilities to meet users' requirements for speed of response in interactive applications or speed of throughput in production batch and/or transaction processing applications.
- primary index (key)- In some implementations, but not in RDBMS, an index (and associated key) that uniquely identifies each row of a table.
- process- An execution unit, which may or may not be identical to an application program. (An application program may involve multiple processes.)

Exp ₃ Mail Label No.
US EL200037275
52-3180

-23-

- Process-Local SQL Cache- The configured memory space in which code segments generated by RDBMS are stored for reuse if the same SQL statement is executed again by the same process.
- query- Used to refer to any SQL statement that causes an access to relational tables, regardless of whether the access is followed by a modification.
- read-ahead feature- The Buffer Manager's operational mode in which up to 16 pages are read into the buffer pool at one time, so that the data will be available when needed. The read-ahead feature is used in scan access mode.
- recovery- The process of restoring database(s) and/or application(s) to a known state after an exception condition or a process or system failure.
- Relational Access Manager (RAM)- The part of the RDBMS software that manages relational tables.
- Relational database- A database that is defined in terms of entities, attributes, and relationships, and that observes the concepts defined originally by E.F. Codd.
- Relational Database Management System (RDBMS)- The INTEREL Software that manages relational databases.
- Relational File Manager (RFM)- The part of the RDBMS software that accesses data from relational files, as directed by the Relational Access Manager (RAM).
- relationship- An association of one or more entity types with one or more other entity types.
- row- The horizontal component of a table. A row consists of a sequence of values, one for each column of the table.

Express Mail Label No.
US EL200037275
52-3180

| | | |
|---|---|---|
| • scan access- | | The access mode in which RDBMS scans a table sequentially, row-by-row, to retrieve the requested information. |
| • search condition- | | The specification of how to identify the desired data in the rows and columns retrieved when processing an SQL statement. |
| • secondary index- | | In some RDMBS implementations, any index that is not a primary index. In RDBMS, most indexes are treated as secondary indexes; cluster indexes and system-generated indexes created because a column is defined with the UNIQUE attribute are the exceptions to this rule. RDBMS enforces the uniqueness of the columns included in these indexes. |
| • SELECT- | | An SQL statement that defines the information to be selected from one or more tables. Also a clause that includes the SELECT verb in an SQL statement. |
| • single-column index (key)- | | An index and key made up of only one column. |
| • single-table tablespace- | | An unpartitioned tablespace that contains one table. The tablespace is a single physical file. Contrast this with multi-table tablespace and with partitioned tablespace. |
| • SMALLINT data type- | | An RDBMS data type used to store binary values, using less space than is required for the INTEGER data type. |
| • SQL- | | Originally an acronym for Structured Query Language. Now the name of the language most commonly used to access relational databases. |
| • SQL Cache- | | Configured memory space in which code segments generated by RDBMS are stored for reuse if the same |

|   |   |
|---|---|
|   | SQL statement is executed again. There are two levels of SQL Cache, Process-Local SQL Cache and Central SQL Cache. |
| • table- | The relational component that corresponds to a file in non-relational technology. Tables have two forms: hash and non-hash. |
| • tablespace- | Physical space that is created explicitly to contain one or more tables in a relational database. If a tablespace is not created explicitly, the table is stored in space allocated by the system. Space allocated by the system is not called a tablespace. |
| • TIME data type- | A special-purpose RDBMS data type used to store a three-byte time that can be used in comparisons or computations. The time is formatted as packed decimal in the row in storage, and expanded when read into application memory. |
| • TIMESTAMP data type- | A special-purpose RDBMS data type used to store a 10-byte time stamp that can be used in comparisons or computations. The timestamp is formatted as packed decimal in the row in storage, and expanded when read into application memory. |
| • Transaction Processing Routine (TPR)- | An application program that processes transactions under control of a transaction monitor. In the context of this publication, the transaction monitor is TP8. |
| • tuning- | The process of adjusting database definitions, application implementations, and/or system parameters to improve performance. |

Exp. Mail Label No.
US EL200037275
52-3180

- UNIQUE key- An index key or a hash key made up of one or more columns in which no duplicate values are allowed.
- unpartitioned tablespace- A tablespace that contains either a single table or multiple tables. The latter case is called a multi-table tablespace. In both cases, the tablespace is a single physical file. Contrast this with partitioned tablespace.
- user- An individual who accesses RDBMS databases by means of an application or interactive facility.
- VARCHAR data type- An RDBMS data type defined as variable-length character.
- WHERE clause- The part of an SQL statement that defines the conditions (restrictions) for selecting data before grouping (if grouping is specified). These restrictions are referred to as search conditions.

Express Mail Label No.
US EL200037275
52-3180

-27-

APPENDIX II

1. Code Snippets utilized by gen_retr_method function for Generating the Call to Retrieve a Row

Snippet 1 - gen_retr_method

```
if (bypassRFM)
    sts = genGetRowDirect(rec);   << generates the new call and
else                                            supporting logic.
    sts = gen_rfm_getRow(rec, fldlst); << generates the old call
                                          and supporting logic.
```

Snippet 2 - genGetRowDirect function subset
Note: Input parameter rec is a structure that contains all the information required to retrieve the row including a pointer to where the DBKEY resides in the data section for the code burst.

```
int     genGetRowDirect(rec)
REC     *rec;                    /* REC for record to get  */
{
int     sts;

sts = initRFM_XPT(rec, 0, 0, 0);
sts = initDataRecHdr(rec);
sts = genRFMIO8Call(rec);    << generates the new call.
sts = genCopyColumns(rec);   << generates code in Appendix III.

return(0);
}
```

Snippet 3 - genRFMIO8Call
Note: This uses the putcode macro to write the argument to the code segment. The macro increments the instruction counter by one for every insert. The second argument to the putcode macro is one that dictates whether the address field of the instruction must be relocated when the code is placed into execution. Typically, references to the data section require relocation and others don't.

Exp̲ ̲ Mail Label No.
US EL200037275
52-3180

-28-

```
    /* call 'afhgrfmi' to do the function    */
    if((sts = putcode((parofs << 16) | 0635400, RELOC_CS)) < 0)
        return (sts);                           /* EPPR5 params        */
5   if((sts = putcode(0000002630404, RELOC_NONE)) < 0)
        return (sts);                           /* EPPR0 *+2           */
    calofs = ptr_to_long((void *) rfm_io8_get_record);  << link to new
    subroutine.
    calofs -= BIAS;
10  calofs &= 0077777000000;
    if((sts = putcode(calofs | 0300000710100, RELOC_NONE)) < 0)  <<
    insert call in code
        return (sts);                           /* TRA
    rfm8gr,,p3 */
15  calofs = ptr_to_long((void *) ram_rfm_error);
    calofs -= BIAS;
    calofs &= 0077777000000;
    if((sts = putcode(calofs | 0300000710100, RELOC_NONE)) < 0)
        return (sts);                           /* TRA rfm_err,,p3    */
20  return(0);
```

Exp̱ ₃ Mail Label No.
US EL200037275
52-3180

-29-

2. Code Snippets utilized by gen_index_leaf function for Generating the Call to Retrieve the Next Index Entry

Snippet 1 - gen_index_leaf

The following code sets the transfer offset based on the state of
5   The bypassRFM option then builds the call to the subroutine library.

```
    if (bypassRFM)
        calofs  =  ptr_to_long ((void *) rfm_io8_getNext);
    else
10      calofs  =  ptr_to_long ((void *) rfm_getnext_indexe);
    calofs  &= 0077777000000;
    ...
    if((sts  =  putcode(calofs | 03000007101000, RELOC_NONE)) < 0
            return  (sts);           /* TRA    getix,,p3   */
```

Express Mail Label No.
US EL200037275
52-3180

-30-

APPENDIX III

1. Code Generated at Execution Time to Optimize Data Row Retrieval

The following code was generated by the code generation component to handle the data retrieval task for the query:

```
    SELECT playerNum , lastName , school FROM cards98 WHERE playerNum = " 31 "

* Initialize the RFM_XPT structure
000350  001274450000  STZ  01274
000351  001275450000  STZ  01275
000352  001276450000  STZ  01276
000353  001277450000  STZ  01277
000354  006000236007  LDQ  06000,DL
000355  001316756000  STQ  01316
000356  001317756000  STQ  01317
000357  000726236000  LDQ  0726  RFM Schema Pointer
000360  001220756000  STQ  01220
****************************************
* Get row from IO8, bypass RFM
****************************************
000361  000726236000  LDQ  0726  RFM Schema Pointer
000362  001330756000  STQ  01330
000363  000730236000  LDQ  0730  Data Base Key
000364  001331756000  STQ  01331
000365  000734236000  LDQ  0734  RFM RAP Number
000366  001332756000  STQ  01332
000367  001330635400  EPPR5 01330
000370  000002630404  EPPR0 02,IC
000371  345546710100  TRA  RFM_IO8_GET_RECORD-BIAS,,P3
000372  343662710100  TRA  RAM_RFM_ERROR-BIAS,,P3
* Copy columns from IO8 to record buffer
* Copy a column and set its indicator variable
000373  000765450000  STZ  0765
000374  001321727000  LXL7 01321 Offset  (via data record header)
000375  001322221000  LDX1 01322 Length  (via data record header)
000376  000004601004  TNZ  04,IC
000377  000001336007  LCQ  01,DL       zero length = NULL
000400  000765756000  STQ  0765
000401  000006710004  TRA  06,IC
000402  000000226003  LDX6 00,DU Offset (into the code's data space)
000403  000004220003  LDX0 04,DU Length (max length of column)
000404  040056100557  MLR  (AR,RL,,x7),(,RL,,x6)  copy the column
000405  700006400011  ADSC9 06,2,x1,P7
000406  000742000010  ADSC9 0742,0,x0
* Copy a column and set its indicator variable
000407  000767450000  STZ  0767
000410  001323727000  LXL7 01323 Offset  (via data record header)
000411  001324221000  LDX1 01324 Length  (via data record header)
000412  000004601004  TNZ  04,IC
000413  000001336007  LCQ  01,DL       zero length = NULL
000414  000767756000  STQ  0767
000415  000006710004  TRA  06,IC
000416  000023226003  LDX6 023,DU Offset (into the code's data space)
000417  000014220003  LDX0 014,DU Length (max length of column)
000420  040056100557  MLR  (AR,RL,,x7),(,RL,,x6)  copy the column
000421  700006400011  ADSC9 06,2,x1,P7
000422  000742000010  ADSC9 0742,0,x0
```

Exp. Mail Label No.
US EL200037275
52-3180

-31-

```
* Copy a column and set its indicator variable
000423 000766450000 STZ 0766
000424 001322727000 LXL7 01322 Offset  (via data record header)
000425 001323221000 LDX1 01323 Length  (via data record header)
000426 000004601004 TNZ 04,IC
000427 000001336007 LCQ 01,DL          zero length = NULL
000430 000766756000 STQ 0766
000431 000006710004 TRA 06,IC
000432 000004226003 LDX6 04,DU Offset (into the code's data space)
000433 000017220003 LDX0 017,DU Length (max length of column)
000434 040056100557 MLR (AR,RL,,x7),(,RL,,x6)  copy the column
000435 700006400011 ADSC9 06,2,x1,P7
000436 000742000010 ADSC9 0742,0,x0
```

RFM_IO8_GET_RECORD is the runtime codegen support subroutine that receives as input the DBKEY, calls IO8 and returns with the data buffer header moved into the generated code's data space. It also returns with pointer register P7 pointing to the data row in the IO8 buffer. So, the generated code has the data space offsets to the record header "baked in" at generation time that makes acquisition of this information extremely fast.

Express Mail Label No.
US EL200037275
52-3180

-32-

APPENDIX IV.

1. Example of Code Generated to Call the Index Retrieval Subroutines

```
* Initialize the RFM_XPT structure
000366 107122223003 LDX3 0107122,DU
000367 001506443000 SXL3 01506
000370 001542450000 STZ 01542
000371 001543450000 STZ 01543
000372 001544450000 STZ 01544
000373 001545450000 STZ 01545
000374 006000236007 LDQ 06000,DL
000375 001564756000 STQ 01564
000376 001565756000 STQ 01565
000377 001242236000 LDQ 01242 RFM Schema Pointer
000400 001466756000 STQ 01466
****************************************
* Get RFM index entry for record with EC at 502216006112
****************************************
000401 001572635400 EPPR5 01572
000402 000002630404 EPPR0 02,IC
000403 346130710100 TRA RFM_GET_INDEXE-BIAS,,P3
000404 343662710100 TRA RAM_RFM_ERROR-BIAS,,P3
000405 000000116007 CMPQ 00,DL
000406 000767604000 TMI 0767 No More Records
000407 001244756000 STQ 01244 Data Base Key
000410 000426710000 TRA 0426
000411 001432236000 LDQ 01432
000412 001252756000 STQ 01252
000413 001436236000 LDQ 01436
000414 001250756000 STQ 01250
000415 001434236000 LDQ 01434 IXNUM for Retrieval
000416 001254756000 STQ 01254
****************************************
* Get next RFM index entry for record with EC at 502216006112
****************************************
000417 001602635400 EPPR5 01602
000420 000002630404 EPPR0 02,IC
000421 346260710100 TRA RFM_IO8_GETNEXT-BIAS,,P3 (New Subroutine Library function)
000422 343662710100 TRA RAM_RFM_ERROR-BIAS,,P3
000423 000000116007 CMPQ 00,DL
000424 000406604051 TMI 0406,I No More Records
000425 001244756000 STQ 01244 Data Base Key
* Compare saved key buffer to key returned by RFM
000426 000002227003 LDX7 02,DU
000427 000012336007 LCQ 012,DL
```

-33-

```
000430 000040106440 CMPC (,RL,,),(,RL,,)
000431 001306000017 ADSC9 01306,0,x7
000432 001460000017 ADSC9 01460,0,x7
000433 000411600000 TZE 0411 Get next Record
```

Express Mail Label No.
US EL200037275
52-3180

-34-
APPENDIX V.
1. Optimizer Output-EDOT Example:
For the query:
```
select firstName, ssNumber from student
    where lastName = 'Jones' and middleInitial = 'A';
```
the RAM Optimizer produces the following EDOT:
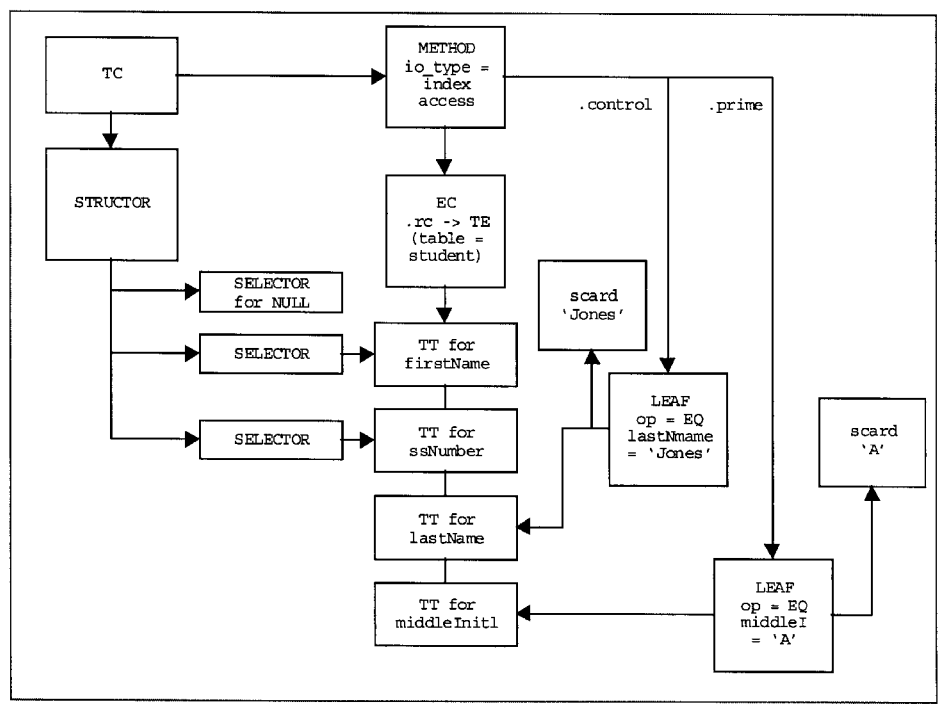

Express Mail Label No.
US EL200037275
52-3180

-35-

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for enhancing the performance of a data manager that manages a relational database, the manager having a number of operatively coupled component layers for performing functions required for accessing the relational database file records in response to user query statements, the number of component layers including a first component layer for generating code used in executing the query statement in response to input representing an optimized form of the query statement and a number of lower component layers including at least a second lower component layer for performing predetermined functions required for executing the query statement, the method comprising the steps of:

(a) expanding a subroutine library included within the first component layer to include a number of performance enhancing subroutines designed to execute functions performed by lower component layers substantially faster than if the functions were executed by the number of lower component layers, each performance enhancing subroutine including code for determining conditions under which the particular subroutine is to be invoked during query execution time;

(b) during the generating of the code, the first component layer adding calls to the number of performance enhancing subroutines in place of normally included calls to lower component layers for causing the insertion of the different subroutines into the generated code from the subroutine library; and, (c) during query execution time, the first component layer executing the generated code by invoking the performance subroutines to perform the second lower layer functions based on the characteristics of query statement being processed for providing increased performance.

2. The method of claim 1 wherein the lower layer predetermined functions relate to record management functions.

3. The method of claim 1 wherein the first component layer includes a code generation component and the second component layer includes a relational file manager component.

4. The method of claim 1 wherein the number of lower component layers further includes a third lower component layer operatively coupled to the first component layer, to the second lower component layer and to the relational database for executing input/output operations required for executing the query statement.

5. The method of claim 1 wherein in step (c), the first component layer invokes the performance subroutines to perform the third lower component layer functions based on the characteristics of the query statement being executed resulting in increased performance.

6. The method of claim 5 wherein the third lower component layer includes an input/output controller component that operatively couples to the relational database.

7. The method of claim 1 wherein each performance enhancing routine code includes logic for determining when to utilize the routine for performing a lower layer function in executing the query statement.

8. The method of claim 7 wherein the logic determines when to utilize the routine based on either the characteristics of a particular data record being processed or the type of operation being performed.

9. The method of claim 7 wherein during query execution time, the logic operates to bypass calls to one of the number of the lower component layers normally used to perform the lower layer function thereby resulting in increased performance.

10. A data manager for managing a relational database, the manager having a number of operatively coupled component layers for performing functions required for accessing database file records of the relational database in response to user query statements, the number of component layers including a first component layer for generating code used in executing the query statement in response to input representing an optimized form of the query statement and a number of lower component layers operatively coupled to the first component layer, to each other and to the relational database, the lower component layers including at least a second lower component layer for performing functions required for executing the query statement, the first component layer further including:

(a) a subroutine library expanded to include a number of performance enhancing subroutines designed to execute functions performed by lower component layers substantially faster than if the functions were executed by the number of lower component layers, each performance enhancing subroutine including code for determining conditions under which the particular subroutine is to be invoked during query execution time;

(b) code generation component operative during the generating of the code to be used in executing the query to add calls to the number of performance enhancing subroutines in place of normally included calls to lower component layers for causing the insertion of the different subroutines from the subroutine library into the code being generated for execution of the query being processed; and, (c) code generation storage for storing the code generated by the code generation component for executing the query, the storage when accessed by the first component layer during execution of the query causing the performance subroutines to be invoked for performing the second lower layer functions based on the characteristics of query statement being executed resulting in increased performance.

11. The data manager of claim 10 wherein the lower layer predetermined functions relate to record management functions.

12. The data manager of claim 10 wherein the second component layer includes a relational file manager component.

13. The data manager of claim 10 wherein the number of lower component layers further includes a third lower component layer operatively coupled to the first component layer, to the second lower component layer and to the relational database for executing input/output operations required for executing the query statement.

14. The manager of claim 13 wherein in the first component layer during the execution of the query invokes the performance subroutines to perform the third lower component layer functions based on the characteristics of the query statement being executed resulting in increased performance.

15. The data manager of claim 14 wherein the third lower component layer includes an input/output controller component that operatively couples to the relational database.

16. The data manager of claim 10 wherein each performance enhancing routine code includes logic for determining when to utilize the routine for performing a lower layer function in executing the original query statement.

17. The data manager of claim 16 wherein the logic determines when to utilize the routine based on either the characteristics of a particular data record being processed or the type of operation being performed.

18. The data manager of claim 16 wherein during query execution time, the logic operates to bypass calls to one of the number of the lower component layers normally used to perform the lower layer function thereby resulting in increased performance.

19. The data manager of claim 16 wherein during query execution time, the logic operates to bypass calls to one of the number of the lower component layers normally used to perform the lower layer function thereby resulting in increased performance.

20. The data manager of claim 10 wherein the code generation component of the first component layer includes a first and second routines for generating code containing predetermined calls to performance enhancing routines for enhancing the execution of first and second types of operations by the data manager.

21. The data manager of claim 20 wherein the first component layer further includes an optimizer component for generating a set of control structures representative a devised access plan strategy for optimizing execution of the query, the set of structures being applied as an input to the code generation component for use in generating code for executing the query.

22. An RDMS program product including a data manager for managing a relational database stored on a media as groups of program instructions, the instructions corresponding to a number of operatively coupled component layers for performing functions required for accessing database file records of the relational database in response to user query statements, the number of component layers including a first component layer for generating code used in executing the query statement in response to input representing an optimized form of the query statement and a number of lower component layers operatively coupled to the first component layer, to each other and to the relational database, the lower component layers including at least a second lower component layer for performing functions required for executing the query statement, the first component layer further including:

(a) a first group of instructions corresponding to a subroutine library expanded to include a number of performance enhancing subroutines designed to execute functions performed by lower component layers substantially faster than if the functions were executed by the number of lower component layers, each performance enhancing subroutine including code containing instructions for determining conditions under which the particular subroutine is to be invoked during query execution time;

(b) a second group of instructions corresponding to a code generation component operative during the generating of the code to be used in executing the query to add calls to the number of performance enhancing subroutines in place of normally included calls to lower component layers for causing the insertion of the different subroutines from the subroutine library into the code being generated for execution of the query being processed; and, (c) another group of instructions that operate under the control of the code during the execution of query, to invoke the performance subroutines for performing the second lower layer functions based on the characteristics of query statement being executed resulting in increased performance.

23. A memory for storing a data manager for accessing data records of a relational database during the execution of a query, the memory comprising:

(a) first component layer for generating code used in executing the query statement in response to input representing an optimized form of the query statement and a number of lower component layers operatively coupled to the first component layer, to each other and to the relational database, the lower component layers including at least a second lower component layer for performing functions required for executing the query statement, the first component layer contained in the memory further including:

(1) a subroutine library expanded to include a number of performance enhancing subroutines designed to execute functions performed by lower component layers substantially faster than if the functions were executed by the number of lower component layers, each performance enhancing subroutine including code for determining conditions under which the particular subroutine is to be invoked during query execution time;

(2) code generation component operative during the generating of the code to be used in executing the query to add calls to the number of performance enhancing subroutines in place of normally included calls to lower component layers for causing the insertion of the different subroutines from the subroutine library into the code being generated for execution of the query being processed; and, (3) code generation storage for storing the code generated by the code generation component for executing the query, the storage when accessed by the first component layer during execution of the query causing the performance subroutines to be invoked for performing the second lower layer functions based on the characteristics of query statement being executed resulting in increased performance.

* * * * *